(12) United States Patent
Ryu et al.

(10) Patent No.: US 11,476,498 B2
(45) Date of Patent: Oct. 18, 2022

(54) COMPLEX SOLID ELECTROLYTE MEMBRANE FOR ALL-SOLID-STATE BATTERY AND ALL-SOLID-STATE BATTERY INCLUDING SAME

(71) Applicant: LG Chem, Ltd., Seoul (KR)

(72) Inventors: Ji-Hoon Ryu, Daejeon (KR); Guilong Jin, Daejeon (KR); Ji-Hee Ahn, Daejeon (KR); Sung-Joong Kang, Daejeon (KR); Jae-Hyun Lee, Daejeon (KR)

(73) Assignee: LG Energy Solution, Ltd.

( * ) Notice: Subject to any disclaimer, the term of this patent is extended or adjusted under 35 U.S.C. 154(b) by 305 days.

(21) Appl. No.: 16/628,177

(22) PCT Filed: Mar. 22, 2019

(86) PCT No.: PCT/KR2019/003400
§ 371 (c)(1),
(2) Date: Jan. 2, 2020

(87) PCT Pub. No.: WO2019/190126
PCT Pub. Date: Oct. 3, 2019

(65) Prior Publication Data
US 2020/0153041 A1    May 14, 2020

(30) Foreign Application Priority Data
Mar. 27, 2018 (KR) .......................... 10-2018-0035291

(51) Int. Cl.
*H01M 10/0565* (2010.01)
*H01M 4/1399* (2010.01)
(Continued)

(52) U.S. Cl.
CPC ..... *H01M 10/0565* (2013.01); *H01M 4/1399* (2013.01); *H01M 10/0525* (2013.01); *H01M 10/0562* (2013.01); *H01M 2300/0068* (2013.01)

(58) Field of Classification Search
CPC ......... H01M 10/0565; H01M 10/0525; H01M 10/0562; H01M 4/1399; H01M 4/133
See application file for complete search history.

(56) References Cited

U.S. PATENT DOCUMENTS

| 5,437,692 A | 8/1995 | Dasgupta et al. |
| 6,413,667 B1 | 7/2002 | Gozdz |

(Continued)

FOREIGN PATENT DOCUMENTS

| CN | 102709597 A | 10/2012 |
| CN | 106159318 A | 11/2016 |

(Continued)

OTHER PUBLICATIONS

Extended European Search Report for Application No. EP19777945.7 dated Dec. 4, 2020, 5 pgs.

(Continued)

*Primary Examiner* — Sarah A. Slifka
(74) *Attorney, Agent, or Firm* — Lerner, David, Littenberg, Krumholz & Mentlik, LLP (57) ABSTRACT

Provided is a composite solid electrolyte membrane for an all-solid-state secondary battery, including: a phase transformation layer containing a plasticizer and a lithium salt; a porous polymer sheet layer; and a solid polymer electrolyte layer, wherein the phase transformation layer, the porous polymer sheet layer and the solid polymer electrolyte layer are stacked successively, and the phase transformation layer is disposed in such a manner that it faces a negative electrode when manufacturing an electrode assembly. An (Continued)

all-solid-state secondary battery including the composite solid electrolyte membrane is also provided. The composite solid electrolyte membrane for an all-solid-state secondary battery reduces the interfacial resistance with an electrode, increases ion conductivity, and improves the safety of a battery.

18 Claims, 2 Drawing Sheets

(51) Int. Cl.
*H01M 10/0525* (2010.01)
*H01M 10/0562* (2010.01)

(56) References Cited

U.S. PATENT DOCUMENTS

| | | | |
|---|---|---|---|
| 7,335,321 | B1 | 2/2008 | Birke et al. |
| 2002/0122987 | A1 | 9/2002 | Tamura et al. |
| 2002/0187401 | A1 | 12/2002 | Lee et al. |
| 2002/0197536 | A1 | 12/2002 | Mori et al. |
| 2013/0260257 | A1 | 10/2013 | Choi |
| 2016/0064770 | A1 | 3/2016 | Lee et al. |
| 2017/0141429 | A1 | 5/2017 | Lee et al. |
| 2019/0051934 | A1 | 2/2019 | Kim et al. |

FOREIGN PATENT DOCUMENTS

| | | |
|---|---|---|
| JP | H09134730 A | 5/1997 |
| JP | H09293518 A | 11/1997 |
| JP | H10007831 A | 1/1998 |
| JP | H11339557 A | 12/1999 |
| JP | 2000268875 A | 9/2000 |
| JP | 2001217008 A | 8/2001 |
| JP | 2001319690 A | 11/2001 |
| JP | 2003059535 A | 2/2003 |
| JP | 200616550 A | 1/2006 |
| JP | 4624304 B2 | 2/2011 |
| JP | 2013069682 A | 4/2013 |
| KR | 20020002858 A | 1/2002 |
| KR | 100376051 B1 | 3/2003 |
| KR | 20090058594 A | 6/2009 |
| KR | 20130111833 A | 10/2013 |
| KR | 20160026648 A | 3/2016 |
| KR | 101734301 B1 | 5/2017 |
| KR | 20180015843 A | 2/2018 |
| WO | 2017135553 A1 | 8/2017 |

OTHER PUBLICATIONS

International Search Report from Application No. PCT/KR2019/003400 dated Jun. 26, 2019, 3 pages.
Search Report dated Jul. 28, 2022 from Office Action for Chinese Application No. 201980003373.5 issued Aug. 3, 2022. 3 pgs.

COMPLEX SOLID ELECTROLYTE MEMBRANE FOR ALL-SOLID-STATE BATTERY AND ALL-SOLID-STATE BATTERY INCLUDING SAME

CROSS-REFERENCE TO RELATED APPLICATIONS

The present application is a national phase entry under 35 U.S.C. § 371 of International Application No. PCT/KR2019/003400 filed Mar. 22, 2019, which claims priority from Korean Patent Application No. 10-2018-0035291 filed Mar. 27, 2018, all of which are incorporated herein by reference.

TECHNICAL FIELD

The present disclosure relates to a composite solid electrolyte membrane for an all-solid-state secondary battery and an all-solid-state secondary battery including the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

According to the related art, a liquid electrolyte (electrolyte liquid), such as a combustible organic solvent, has been used for such a lithium secondary battery. However, it is likely that such a battery using a liquid electrolyte causes problems, such as leakage of an electrolyte, ignition and explosion.

To ensure essential safety by solving the above-mentioned problems, active studies have been conducted about use of a solid electrolyte instead of a liquid electrolyte. A battery, constitutional elements of which, including an electrolyte, are totally solid is called an all-solid-state secondary battery. The all-solid-state secondary battery has been given many attentions as a next-generation lithium secondary battery in terms of safety, high energy density, high output, simplification of manufacturing processes, or the like.

However, in such an all-solid-state secondary battery, all of the electrodes and solid electrolyte membrane are in a solid state and any liquid electrolyte is not used. Thus, a dead space, a void having no conductivity, is generated undesirably at the interface between the electrode and solid electrolyte membrane.

Particularly, when the surface of an electrode is not uniform due to the shape of an electrode active material, aggregation of a conductive material or spacing of a binder polymer, more dead spaces are generated so that resistance between the electrode and the solid electrolyte membrane may be increased and the life characteristics of a battery may be affected adversely.

To solve the above-mentioned problems, there has been an attempt to add a part of liquid electrolyte to the all-solid-state secondary battery so that the interface between the electrode and the solid electrolyte membrane may be filled with the liquid electrolyte. However, injection of a liquid electrolyte is carried out after the assemblage of an electrode assembly. In this case, there are disadvantages in that an excessive amount of liquid electrolyte should be injected and the injected liquid electrolyte may soften the solid electrolyte membrane.

DISCLOSURE

Technical Problem

The present disclosure is designed to solve the problems of the related art, and therefore the present disclosure is directed to providing a composite solid electrolyte membrane for an all-solid-state secondary battery and an all-solid-state secondary battery including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a composite solid electrolyte membrane according to any one of the following embodiments.

According to the first embodiment of the present disclosure, there is provided a composite solid electrolyte membrane for an all-solid-state secondary battery, including:

a phase transformation layer containing a plasticizer and a lithium salt;

a porous polymer sheet layer; and a solid polymer electrolyte layer, wherein the phase transformation layer, the porous polymer sheet layer and the solid polymer electrolyte layer are stacked successively, and the phase transformation layer is disposed in such a manner that it may face a negative electrode when manufacturing an electrode assembly.

According to the second embodiment of the present disclosure, there is provided the composite solid electrolyte membrane for an all-solid-state-secondary battery as defined in the first embodiment, wherein the plasticizer and lithium salt are in a solid state at 15-25° C.

According to the third embodiment of the present disclosure, there is provided the composite solid electrolyte membrane for an all-solid-state-secondary battery as defined in the first or the second embodiment, wherein the plasticizer and lithium salt are liquefied at 30° C. or higher.

According to the fourth embodiment of the present disclosure, there is provided the composite solid electrolyte membrane for an all-solid-state-secondary battery as defined in any one of the first to the third embodiments, wherein the plasticizer has a melting point of 30-130° C.

According to the fifth embodiment of the present disclosure, there is provided the composite solid electrolyte membrane for an all-solid-state-secondary battery as defined in any one of the first to the fourth embodiments, wherein the plasticizer includes any one of ethylene carbonate, polyethylene glycol having a weight average molecular weight of 1,000 or more, succinonitrile and cyclic phosphate, or a mixture of at least two of them.

According to the sixth embodiment of the present disclosure, there is provided the composite solid electrolyte membrane for an all-solid-state-secondary battery as defined in any one of the first to the fifth embodiments, wherein the lithium salt includes $Li^+$ as cation, and includes, as anion, $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF6-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, $(CF_3CF_2SO_2)_2N^-$, or at least two of them.

According to the seventh embodiment of the present disclosure, there is provided the composite solid electrolyte membrane for an all-solid-state-secondary battery as defined in any one of the first to the sixth embodiments, wherein the plasticizer and the lithium salt are used at a weight ratio of 99:1-40:60.

According to the eighth embodiment of the present disclosure, there is provided the composite solid electrolyte membrane for an all-solid-state-secondary battery as defined in any one of the first to the seventh embodiments, wherein the porous polymer sheet layer has a thickness of 5-50 μm and a porosity of 40-60%.

According to the ninth embodiment of the present disclosure, there is provided the composite solid electrolyte membrane for an all-solid-state-secondary battery as defined in any one of the first to the eighth embodiments, wherein the solid polymer electrolyte layer includes a solid polymer electrolyte.

According to the tenth embodiment of the present disclosure, there is provided the composite solid electrolyte membrane for an all-solid-state-secondary battery as defined in any one of the first to the ninth embodiments, wherein the solid polymer electrolyte layer has a thickness of 5-300 μm and a porosity of 0-30%.

In another aspect of the present disclosure, there is also provided an all-solid-state secondary battery according to any one of the following embodiments.

According to the eleventh embodiment of the present disclosure, there is provided an all-solid-state secondary battery, including: a positive electrode; a negative electrode; and the composite solid electrolyte membrane as defined in any one of the first to the tenth embodiments, wherein the phase transformation layer in the composite solid electrolyte membrane is disposed in such a manner that it may face the negative electrode, the negative electrode active material in the negative electrode includes a graphite-based material, the plasticizer and lithium salt are in a solid state at 15-25° C., the phase transformation layer is liquefied at a temperature of 30° C. or higher, and the plasticizer and the lithium salt in the liquefied phase transformation layer are disposed between the negative electrode and the porous polymer sheet layer to reduce the interfacial resistance between the negative electrode and the porous polymer sheet layer.

According to the twelfth embodiment of the present disclosure, there is provided the all-solid-state secondary battery as defined in the eleventh embodiment, wherein the graphite-based material includes natural graphite, artificial graphite, mesocarbon microbeads (MCMB), carbon fibers, carbon black, soft carbon, hard carbon, or at least two of them.

According to the thirteenth embodiment of the present disclosure, there is provided the all-solid-state secondary battery as defined in the eleventh or the twelfth embodiment, wherein the phase transformation layer is liquefied at a temperature of 30° C. or higher so that it may be incorporated into the porous polymer sheet layer, thereby reducing the interfacial resistance between the porous polymer sheet layer and the solid polymer electrolyte layer.

According to the fourteenth embodiment of the present disclosure, there is provided the all-solid-state secondary battery as defined in any one of the eleventh to the thirteenth embodiments, wherein the plasticizer has a melting point of 30-130° C., and the all-solid-state secondary battery is activated at a temperature ranging from the melting point of the plasticizer to 130° C.

According to the fifteenth embodiment of the present disclosure, there is provided the all-solid-state secondary battery as defined in any one of the eleventh to the fourteenth embodiments, which includes a softened solid polymer electrolyte layer between the solid polymer electrolyte layer and the porous polymer sheet layer.

Advantageous Effects

The composite solid electrolyte membrane according to the present disclosure includes a phase transformation layer, and the phase transformation layer is liquefied by heating, such as an increase in internal temperature of a battery, thereby reducing the interfacial resistance between an electrode and the composite solid electrolyte membrane.

In addition, the phase transformation layer is liquefied and then is present on the electrode surface, and thus it can reduce contact non-uniformity between the composite solid electrolyte membrane and the electrode surface. Therefore, it is possible to increase the adhesion between the electrode and the porous polymer sheet layer and to reduce the interfacial resistance between the porous polymer sheet layer and the solid polymer electrolyte layer.

The phase transformation layer can fill the dead space in the electrode, when it is liquefied. Therefore, it is possible to increase ion conductivity of lithium ions, to reduce resistance and to improve the life characteristics of a battery.

The phase transformation layer may react with the negative electrode active material layer in the negative electrode, when it is liquefied, to form a solid electrolyte interface (SEI) film, thereby improving the life characteristics of a battery.

Since the phase transformation layer functions as a liquid electrolyte, when it is liquefied, it is possible to increase ion conductivity of a battery, and thus to improve output of the battery.

The composite solid electrolyte membrane for an all-solid-state secondary battery according to the present disclosure includes a porous polymer sheet layer. Thus, it is possible to prevent softening of the solid polymer electrolyte layer occurring when the liquefied plasticizer and lithium salt are in direct contact with the solid polymer electrolyte layer, and degradation of mechanical properties caused thereby. In addition, since the all-solid-state secondary battery includes the porous polymer sheet layer, it is possible to further improve the mechanical strength and safety of a battery.

In the all-solid-state secondary battery according to the present disclosure, a liquid ion conductive material is present between the electrode and the porous polymer sheet layer without any separate liquid electrolyte injection step.

Thus, it is possible to increase ion conductivity and to improve output characteristics.

According to the present disclosure, it is possible to provide an all-solid-state secondary battery having improved safety and life characteristics.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

In an electrode assembly used for an all-solid-state secondary battery, a solid polymer electrolyte layer functions not only as a separator by which a positive electrode and a negative electrode are electrically insulated from each other in a battery but also as a safety device configured to prevent overheating of a battery. In addition, a sold polymer electrolyte layer is an ion conductive layer and thus lithium ions can be transported therethrough, thereby allowing charge/discharge of a battery.

However, since the polymer electrolyte layer in the all-solid-state secondary battery is a solid, spacing is generated between an electrode and the solid polymer electrolyte layer. Thus, there is a problem in that a void having no ion conductivity, i.e. a dead space, is generated.

To solve the above-mentioned problems, a phase transformation layer is introduced between an electrode and a solid polymer electrolyte layer according to the present disclosure. In the phase transformation layer, the plasticizer and lithium salt are transformed into a liquid by heating, such as an increase in internal temperature of a battery. Then, the liquefied plasticizer functions as a solvent to dissolve the lithium salt. As a result, the solid electrolyte and solid lithium salt in the phase transformation layer function as a liquid electrolyte containing the lithium salt dissolved in the liquefied plasticizer. The resultant liquid electrolyte may be incorporated to the porous polymer sheet layer or the dead space present in the electrode, or may be present between the electrode and the porous polymer sheet layer.

The liquefied phase transformation layer is present on the electrode surface, and thus can reduce non-uniformity of the electrode surface. Therefore, it is possible to increase the adhesion between the electrode and the porous polymer sheet layer.

The present disclosure relates to an all-solid-state secondary battery. Particularly, the present disclosure relates to a composite solid electrolyte membrane for an all-solid-state secondary battery and an all-solid-state secondary battery including the same.

The composite solid electrolyte membrane according to the present disclosure is provided with a phase transformation layer at one side of the outermost surface thereof, wherein the phase transformation layer undergoes phase transformation from a solid phase to a liquid phase as the temperature is increased.

In one aspect, there is provided a composite solid electrolyte membrane for an all-solid-state secondary battery, including:

a phase transformation layer containing a plasticizer and a lithium salt;

a porous polymer sheet layer; and a solid polymer electrolyte layer.

Figure 1:
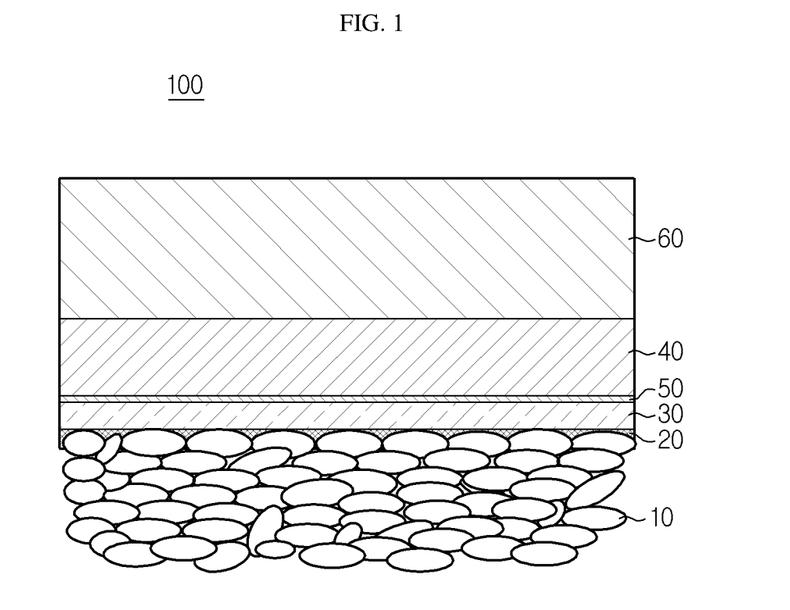
FIG. 1 is a perspective view schematically illustrating the electrode assembly according to an embodiment of the present disclosure.
Figure 2:
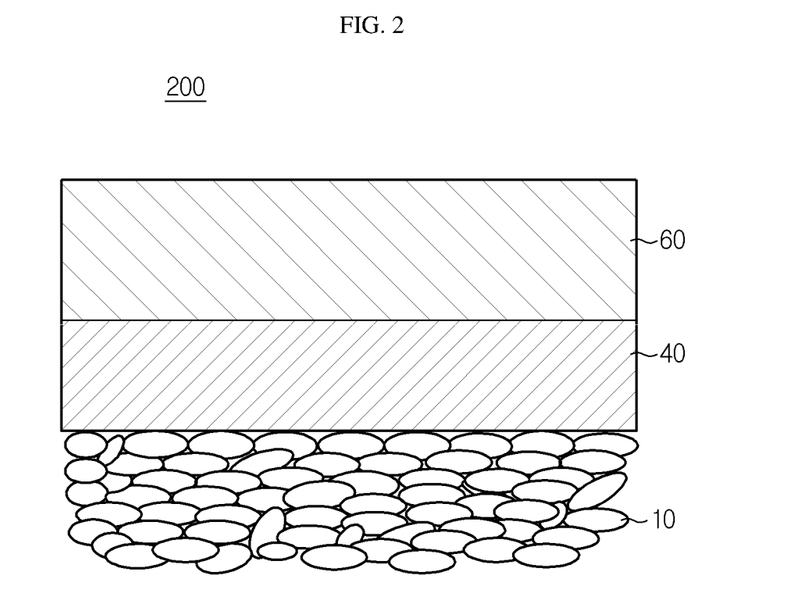
FIG. 2 is a schematic view illustrating the electrode assembly according to Comparative Example.

FIG. 2 is a schematic view illustrating the all-solid-state secondary battery using a conventional solid electrolyte, and FIG. 1 is a perspective view schematically illustrating the all-solid-state secondary battery using a solid electrolyte according to an embodiment of the present disclosure.

Referring to FIGS. 1 and 2, in the case of a battery using the conventional solid electrolyte, resistance between an electrode and the solid polymer electrolyte layer is increased and the life of the battery is affected adversely due to a dead space which is a void having no ion conductivity generated finely between a negative electrode active material layer 10 and a solid polymer electrolyte layer 40.

However, according to the present disclosure, a porous polymer sheet layer 30 is present so that mechanical properties may be retained and softening of the solid polymer electrolyte layer 40 may be decreased.

In addition, a softened solid polymer electrolyte layer 50 by liquefying of a phase transformation layer 20 can increase the adhesion between the porous polymer sheet layer 30 and the solid polymer electrolyte layer 40.

The phase transformation layer includes a plasticizer and a lithium salt.

According to an embodiment of the present disclosure, the phase transformation layer may have a layered structure.

According to an embodiment of the present disclosure, the phase transformation layer may include a first phase transformation layer including a plasticizer and a second phase transformation layer including a lithium salt. Each of the first phase transformation layer and the second phase transformation layer may face the negative electrode.

The plasticizer may have a melting point of 30-130° C.

In other words, since the plasticizer has a melting point of 30-130° C., it may be present in a solid state at room temperature of about 15-25° C.

The plasticizer and the lithium salt in the phase transformation layer are present in a solid state at a temperature of 15-25° C., 17-25° C., or 19-25° C.

The plasticizer and lithium salt may be liquefied at 30° C. or higher, 32° C. or higher, or 35° C. or higher. According to an embodiment of the present disclosure, 'liquefied state' means a state in which a solid plasticizer has liquidity.

The liquefied plasticizer and lithium salt are positioned between the negative electrode and the porous polymer sheet and functions to reduce the interfacial resistance between the negative electrode and the porous polymer sheet layer. In other words, the plasticizer and lithium salt in the phase transformation layer are liquefied and functions as a liquid electrolyte, as the internal temperature of battery is increased.

When the plasticizer and lithium salt in the phase transformation layer are liquefied and transformed into a liquid electrolyte state, the liquid electrolyte is positioned between the negative electrode and the porous polymer sheet layer and may be incorporated into the porous polymer sheet layer. The liquid electrolyte incorporated into the porous polymer sheet layer can reduce the interfacial resistance between the porous polymer sheet layer and the solid polymer electrolyte layer.

In addition, the liquefied plasticizer and lithium salt can fill the dead space in the electrode. Therefore, it is possible to increase ion conductivity, to reduce resistance of the battery and to improve life characteristics.

Meanwhile, the phase transformation layer is disposed in such a manner that it may face the negative electrode when manufacturing an electrode assembly. Accordingly, when the plasticizer and lithium salt in the phase transformation layer is liquefied subsequently, they react with the negative electrode active material layer in the negative electrode to form a solid electrolyte interface (SEI) film, thereby enhancing life characteristics. The SEI film, once it is formed, prevents reaction between lithium ions and the negative electrode or reaction between lithium ions and the other materials, while charge/discharge cycles are repeated during the use of a battery, and functions as an ion tunnel through which only lithium ions pass between the electrolyte and the negative electrode.

According to the present disclosure, any plasticizer may be used without particular limitation, as long as it is in a solid state at 15-25° C. and can be liquefied as the temperature is increased.

According to an embodiment of the present disclosure, the plasticizer is in a solid state at the above-defined temperature range, but is transformed into a liquid phase, when the internal temperature is increased during the aging step of the battery or during the operation of the battery. For example, when the aging step is carried out at about 60° C. for about 10 seconds after the assemblage of the battery, the plasticizer may be liquefied. Herein, the liquefied plasticizer may function as a solvent to dissolve the solid lithium salt, and thus both the plasticizer and lithium salt may be retained in a liquid state. In addition, once the plasticizer and lithium salt are liquefied, they retain a liquid state even when the temperature is decreased to 15-25° C. It is thought that the plasticizer and lithium salt forms a mixture, and the mixture shows a drop in melting point.

According to an embodiment of the present disclosure, when the plasticizer is transformed into a liquid state, it is not essentially required that the battery is operated at a temperature equal to or higher than the melting point of the plasticizer.

According to an embodiment of the present disclosure, the plasticizer includes any one of ethylene carbonate, polyethylene glycol, succinonitrile and cyclic phosphate, or a mixture of at least two of them.

According to an embodiment of the present disclosure, any plasticizer may be used, as long as it is present in a solid state at 15-25° C. but is liquefied at 30° C. or higher.

For example, the plasticizer may be any one of ethylene carbonate (EC) having a melting point of about 37° C., polyethylene glycol (PEG) having a melting point of about 35° C. and a weight average molecular weight of 1,000 or more, succinonitrile (SN) having a melting point of about 57° C. and cyclic phosphate (CP) having a melting point of about 65° C., or a mixture of at least two of them.

Meanwhile, examples of plasticizers non-applicable to the present disclosure include: propylene carbonate (PC) having a melting point of about −49° C., polyethylene glycol (PEG) having a weight average molecular weight less than 1000, 800 or less, or 600 or less, polyethylene glycol dimethyl ether (PEGDME) having a melting point of about −23° C., diethyl phthalate (DEP) having a melting point of about −4° C., or the like. This is because such plasticizers are present in a liquid state at room temperature.

According to an embodiment of the present disclosure, the plasticizer may be ethylene carbonate. Ethylene carbonate has a melting point of about 37° C. and is present in a solid state at room temperature. When solid ethylene carbonate is heated, it is liquefied at about 60° C. Then, liquefied ethylene carbonate can dissolve the surrounding solid lithium salt. After that, once liquefied, ethylene carbonate is present in a liquid state at room temperature, even when the temperature is reduced. This is because the lithium salt as a solute is dissolved in ethylene carbonate as a solvent to cause a drop in melting point of the mixture. The liquid electrolyte including the plasticizer and lithium salt fills the dead space of an electrode, thereby increasing ion conductivity of a battery. In addition, it is possible to reduce resistance of a battery and improve life characteristics.

According to an embodiment of the present disclosure, ethylene carbonate is one used currently for a non-aqueous electrolyte. Therefore, when ethylene carbonate is liquefied, there are advantages in that it can function as a liquid electrolyte applicable to most batteries and it has no impurities. Particularly, such ethylene carbonate has high ion conductivity and oxidation reactivity (6.2V) among non-aqueous electrolytes, and can further improve the performance of a battery after forming a solid electrolyte interface (SEI) film.

According to the present disclosure, any lithium salt may be used, as long as it is in a solid state at 15-25° C. but can be ionized in an electrolyte. The lithium salt may be represented by $Li^+X^-$.

According to an embodiment of the present disclosure, the lithium salt includes $Li^+$ as cation, and includes, as anion, $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, $(CF_3CF_2SO_2)_2N^-$, or at least two of them.

According to an embodiment of the present disclosure, when the plasticizer and lithium salt are liquefied, the lithium salt may be present at a concentration of 0.05-5.0 M, 0.2-4.5 M, 0.2-3.0 M, or 1.0-2.0 M, based on the total mixture of the plasticizer with the lithium salt. The upper limit of lithium salt concentration may be 5.0 M or less, 4.5 M or less, 3.0 M or less, or 2.0 M or less, and the lower limit of lithium salt concentration may be 0.05 M or more, 0.2 M or more, or 1.0 M or more.

When the lithium salt concentration satisfies the above-defined range, the liquefied plasticizer may not be solidified again even after the temperature is reduced subsequently. In addition, when the lithium salt concentration satisfies the above-defined range, the viscosity of lithium salt is maintained suitably in the liquefied mixture to reduce output at low temperature, resulting in improvement of cost-efficiency. In addition, when the plasticizer and lithium salt are liquefied subsequently within the above-defined range, they have ion conductivity suitable for a liquid electrolyte and concentration suitable for reducing resistance at the interface with an electrode.

According to an embodiment of the present disclosure, the plasticizer and lithium salt may be used at a weight ratio of 99:1-40:60, 99:1-45:55, or 98:2-48:52.

According to an embodiment of the present disclosure, when the lithium salt has a molar concentration of 0.1 M based on the total content of the liquefied phase transformation layer, the weight ratio of plasticizer to lithium salt may be 98:2.

According to an embodiment of the present disclosure, when the lithium salt has a molar concentration of 2.0 M based on the total content of the liquefied phase transformation layer, the weight ratio of plasticizer to lithium salt may be 70:30.

According to an embodiment of the present disclosure, when the lithium salt has a molar concentration of 5.0 M based on the total content of the liquefied phase transformation layer, the weight ratio of plasticizer to lithium salt may be 48:52.

When the weight ratio of plasticizer to lithium salt satisfies the above-defined range, the plasticizer and lithium salt liquefied subsequently may have ion conductivity suitable for a liquid electrolyte and a weight ratio suitable for reducing resistance at the interface with an electrode.

The composite solid electrolyte membrane for an all-solid-state secondary battery according to the present disclosure includes a porous polymer sheet layer.

The porous polymer sheet layer can reduce direct contact between the solid polymer electrolyte layer and the liquefied plasticizer and lithium salt. In other words, the porous polymer sheet layer functions as a barrier capable of minimizing softening of the solid polymer electrolyte layer. More particularly, in the phase transformation layer, the plasticizer and lithium salt are liquefied by heating, or the like. When the liquefied plasticizer is in contact with the solid polymer electrolyte layer, the surface of the solid polymer electrolyte layer is softened. According to the present disclosure, since the composite solid electrolyte membrane includes the porous polymer sheet layer, it is possible to prevent or minimize such softening.

In addition, the porous polymer sheet layer is inserted between the negative electrode and the solid polymer electrolyte layer and contributes to the safety of a battery additionally. In other words, it is possible to increase the mechanical strength of the all-solid-state secondary battery.

Any porous polymer sheet layer may be used, as long as it is a planar porous polymer substrate used for an electrochemical device.

According to an embodiment of the present disclosure, the porous polymer sheet layer may include any one of: polyethylene; polypropylene; polybutylene; polypentene; polyhexene; polyoctene; a copolymer of at least two of ethylene, propylene, butane, pentene, 4-methylpentene, hexene and octene; or a mixture of at least two of them. However, the porous polymer sheet layer is not limited thereto.

The porous polymer sheet layer may have a thickness of 5-50 μm, 7.5-30 μm, or 10-20 μm. Within the above-defined thickness range, the lower limit may be 5 μm or more, 7.5 μm or more, or 10 μm or more, and the upper limit may be 50 μm or less, 30 μm or less, or 20 μm or less. When the thickness of the porous polymer sheet layer satisfies the above-defined range, it is possible for the porous polymer sheet to be impregnated with the liquefied plasticizer sufficiently, while providing high ion conductivity by virtue of a short distance of lithium ion transport.

The porous polymer sheet layer may have a porosity of 30-60%, 35-55%, or 40-50%. The lower limit of porosity may be 30%, 35% or 40%, and the upper limit of porosity may be 60%, 55% or 50%. Any combinations of the lower limit with the upper limit may be used. Within the above-defined range, it is possible to prevent the liquefied plasticizer and lithium salt from passing through the pores in the porous polymer sheet layer so that the solid electrolyte may be liquefied, while allowing the liquefied lithium salt to pass through the pores in the porous polymer sheet layer to increase the ion conductivity of a battery. According to the present disclosure, the plasticizer and lithium salt are present in a liquefied state in the porous polymer sheet layer, and thus the porosity of porous polymer sheet layer is more important as compared to the pore size thereof.

According to the present disclosure, porosity may be determined as follows.

Porosity is determined by measuring the diameter of fine pores filled with mercury under a predetermined pressure according to the standard of ASTM D 4282-92. While applying a pressure of 0.5-60,000 psi continuously, the diameter of fine pores is measured at each predetermined pressure and the volume of mercury filled in a separator at that time is measured to determine porosity. Determination is carried out so that the measured and calculated values may be output automatically. The system used for determination is Autopore IV 9500 available from Micrometrics Co., and the range of pore sizes that can be determined in this manner is 0.003-360 μm.

According to the present disclosure, the solid polymer electrolyte layer is an ion conductive layer through which lithium ions can pass and is an insulation layer through which electrons cannot pass, and includes a solid electrolyte.

The solid polymer electrolyte layer is in direct contact with the liquid electrolyte that passes through the porous polymer sheet layer to cause partial softening. The softened solid electrolyte has increased adhesion, and thus can increase the adhesion between the negative electrode and the composite solid electrolyte membrane.

According to an embodiment of the present disclosure, the solid polymer electrolyte layer may include a solid polymer electrolyte.

According to an embodiment of the present disclosure, the solid polymer electrolyte may be a solid polymer electrolyte having high reducing property. According to the present disclosure, the solid polymer electrolyte functions to transport lithium ions in an electrode. Thus, any material having high ion conductivity, such as a material having an ion conductivity of $10^{-6}$ S/cm or more, $10^{-5}$ S/cm or more, or $10^{-4}$ S/cm or more, may be used with no particular limitation.

According to an embodiment of the present disclosure, the solid polymer electrolyte layer may include a solid polymer electrolyte and a lithium salt.

For example, the solid polymer electrolyte layer may be one prepared by adding a lithium salt to a polymer containing a heteroatom, such as oxygen, nitrogen or sulfur, so that the ions of dissociated salt may move in the polymer.

According to an embodiment of the present disclosure, particular examples of the solid polymer electrolyte may include a polyether polymer, polycarbonate polymer, acrylate polymer, polysiloxane polymer, phosphazene polymer, polyethylene derivative, alkylene oxide derivative, phosphate polymer, polyagitation lysine, polyester sulfide, polyvinyl alcohol, polyvinylidene fluoride, polymer containing an ionically dissociatable group, or the like. According to an embodiment of the present disclosure, the solid polymer electrolyte may be a polymer resin, and may be any one selected from the group consisting of polyethylene oxide, polyethylene glycol, polypropylene oxide, polyphosphazene, polysiloxane and copolymers thereof, or a mixture of at least two of them. However, the solid polymer electrolyte is not limited thereto, and any solid polymer electrolyte used conventionally as a solid electrolyte may be used with no particular limitation.

According to an embodiment of the present disclosure, the solid polymer electrolyte may include a polymer resin, such as a branched copolymer including polyethylene oxide (PEO) backbone copolymerized with a comonomer including an amorphous polymer, such as PMMA, polycarbonate, polydimethylsiloxane (PDMS) and/or phosphazene, comblike polymer, crosslinked polymer resin, or the like. The solid polymer electrolyte may be a mixture of such polymers.

According to an embodiment of the present disclosure, the lithium salt includes $Li^+$ as cation, and includes, as anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^{6-}$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$.

According to an embodiment of the present disclosure, the solid polymer electrolyte layer may have a thickness of 5-300 μm, 10-200 μm or 25-100 μm. The solid polymer electrolyte layer may have a thickness of 300 μm or less, 200 μm or less, or 100 μm or less. In addition, the solid polymer electrolyte layer may have a thickness of 5 μm or more, 10 μm or more, or 25 μm or more. Within the above-defined range, it is possible to provide excellent cell performance and high assemblage processability. According to an embodiment of the present disclosure, the solid polymer electrolyte layer may have a porosity of 0-30%, 3-10%, or 5-7%. The solid polymer electrolyte layer may have a porosity of 30% or less, 10% or less, or 7% or less. In addition, the solid polymer electrolyte layer may have a porosity of 0% or more, 3% or more, or 5% or more.

In the case of a solid polymer electrolyte layer, since lithium ions are transported through a solid polymer electrolyte, a solid polymer electrolyte having a high porosity may function as resistance. According to the present disclosure, the solid polymer electrolyte layer satisfies the above-defined range, and thus can have high ion conductivity.

In general, the solid polymer electrolyte layer may have a pore diameter of 0.001-10 μm. According to an embodiment of the present disclosure, the lower limit of pore diameter may be 0.001 μm or more, 0.01 μm or more, or 0.1 μm or more, and the upper limit of pore diameter 10 μm or less, 7 μm or less, or 5 μm or less.

According to the present disclosure, any solid polymer electrolyte may be used, as long as it is softened by being in contact with the phase-transformed plasticizer, when the plasticizer is transformed into a liquid state.

As used herein, 'softening' means a decrease in rigidity of a solid polymer electrolyte layer. As used herein, 'softening' means a decrease in viscosity of a solid polymer electrolyte layer. As used herein, 'softening' means a decrease in at least one of rigidity, viscosity and elasticity of a solid polymer electrolyte layer.

Since the solid polymer electrolyte is chemically stable, it is safe during charge/discharge cycles. In addition, it is easy to handle the solid polymer electrolyte. Thus, the solid polymer electrolyte is advantageous in a process of assembling an electrode assembly.

In the composite solid electrolyte membrane for an all-solid-state secondary battery according to an embodiment of the present disclosure, the phase transformation layer may be formed by applying a solid-state plasticizer and solid-state lithium salt to a small thickness. Next, the porous polymer sheet layer is stacked on the surface of the phase transformation layer. Then, the solid polymer electrolyte layer is stacked on the porous polymer sheet layer to obtain a composite solid electrolyte membrane for an all-solid-state secondary battery.

In addition, according to an embodiment of the present disclosure, the composite solid electrolyte membrane for an all-solid-state secondary battery may be obtained by the method as described hereinafter.

First, a solid polymer electrolyte layer is prepared, and a porous polymer sheet layer is stacked on one surface of the solid polymer electrolyte layer. Then, plasticizer powder and lithium salt powder are applied onto the porous polymer sheet layer to form a phase transformation layer. However, the method for preparing a composite solid electrolyte membrane for an all-solid-state secondary battery according to an embodiment of the present disclosure is not limited to the above-mentioned methods. Any method may be used with no particular limitation, as long as it provides the composite solid electrolyte membrane for an all-solid-state secondary battery according to the present disclosure.

In another aspect, there is provided an all-solid-state secondary battery including the above-described composite solid electrolyte membrane.

According to an embodiment of the present disclosure, the all-solid-state secondary battery includes: a positive electrode; a negative electrode; and the composite solid electrolyte membrane as defined in any one of the above-described embodiments, wherein the composite solid electrolyte membrane includes:

a phase transformation layer containing a plasticizer and a lithium salt;

a porous polymer sheet layer stacked on one surface of the phase transformation layer; and a solid polymer electrolyte layer stacked on one surface of the porous polymer sheet layer, the phase transformation layer is disposed in such a manner that it may face the negative electrode, the negative electrode active material in the negative electrode includes a graphite-based material, the plasticizer and lithium salt are in a solid state at 15-25° C., the phase transformation layer is liquefied at a temperature of 30° C. or higher, and the plasticizer and the lithium salt in the liquefied phase transformation layer are disposed between the negative electrode and the porous polymer sheet layer to reduce the interfacial resistance between the negative electrode and the porous polymer sheet layer.

Herein, the plasticizer may have a melting point of 30-130° C., and the all-solid-state secondary battery may be activated at a temperature ranging from the melting point of the plasticizer to 130° C.

In general, the battery is manufactured, and then finished as a commercially available battery only after carrying out such an activation step at high temperature.

Herein, the high-temperature activation step should be carried out at a high temperature equal to or higher than the melting point of the plasticizer. The activation step may be carried out by allowing the battery to stand at a temperature higher than room temperature, such as 30° C. or higher, preferably 35° C. or higher, and more preferably 50° C. or higher, and 130° C. or lower, preferably 100° C. or lower, and more preferably 90° C. or lower, while carrying out charge/discharge for a predetermined time, or not.

The predetermined activation time may be about 10 seconds to 48 hours, preferably 1 minute to 24 hours, and more preferably 1-8 hours.

Meanwhile, when the activation temperature is higher than 130° C., curing of the binder may occur and the porous polymer sheet layer may be shrunk thermally. Therefore, it is preferred that the activation temperature is 130° C. or lower. For this, it is preferred that the plasticizer has a melting point of 130° C. or lower.

In the all-solid-state secondary battery, the negative electrode is disposed in such a manner that it may face the phase transformation layer of the composite solid electrolyte membrane.

According to the present disclosure, the negative electrode active material layer may include a graphite-based material.

Herein, the graphite-based material may include natural graphite, artificial graphite, mesocarbon microbeads (MCMB), carbon fibers, carbon black, soft carbon, hard carbon, or at least two of them.

Herein, the negative electrode active material may include any one selected from: carbon, such as natural graphite, artificial graphite, non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); metal oxides, such as PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; and lithium titanium oxide; or a mixture of at least two of them.

The plasticizer and lithium salt in the liquefied phase transformation layer may react with the negative electrode active material layer in the negative electrode to form a solid electrolyte interface (SEI) film. The formed SEI film protects lithium salt. The SEI film, once it is formed, prevents reaction between lithium ions and the negative electrode. In addition, the SEI film functions as an ion tunnel through which only lithium ions pass between the electrolyte and the negative electrode.

According to an embodiment of the present disclosure, the phase transformation layer faces the negative electrode to facilitate formation of the SEI film, thereby improving life characteristics of a battery.

The phase transformation layer is liquefied at a temperature of 30° C. or higher so that it may be incorporated into the porous polymer sheet layer, thereby reducing the interfacial resistance between the porous polymer sheet layer and the solid polymer electrolyte layer.

The composite solid electrolyte membrane may include a softened solid polymer electrolyte layer between the solid polymer electrolyte layer and the porous polymer sheet layer. The softened solid polymer electrolyte layer may increase the adhesion between the porous polymer sheet layer and the solid polymer electrolyte layer.

The positive electrode used in combination with the composite solid electrolyte membrane according to the present disclosure is not particularly limited, and may be obtained by binding a positive electrode active material layer to a positive electrode current collector according to the conventional method known to those skilled in the art.

According to an embodiment of the present disclosure, the positive electrode may include a current collector and a positive electrode active material layer formed on the surface of the current collector. The positive electrode active material layer may further include a positive electrode active material, solid electrolyte, binder and a conductive material.

In general, the positive electrode current collector is formed to have a thickness of 3-500 μm. The positive electrode current collector is not particularly limited, as long as it has high conductivity while not causing any chemical change in the corresponding battery. Particular examples of the positive electrode current collector may include stainless steel, aluminum, nickel, titanium, baked carbon, aluminum or stainless steel surface-treated with carbon, nickel, titanium or silver, or the like. In addition, fine surface irregularities may be formed on the surface of the positive electrode current collector to increase the adhesion of the positive electrode active material. The positive electrode current collector may have various shapes, such as a film, sheet, foil, net, porous body, foam, non-woven body, or the like.

The positive electrode active material is not particularly limited, as long as it can be used for a positive electrode for an electrochemical device. For example, the positive electrode active material may include any one selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

The solid electrolyte used in the positive electrode may be a polymer solid electrolyte or an inorganic solid electrolyte.

According to an embodiment of the present disclosure, the polymer solid electrolyte may include a polyether polymer, polycarbonate polymer, acrylate polymer, polysiloxane polymer, phosphazene polymer, polyethylene derivative, alkylene oxide derivative, phosphate polymer, polyagitation lysine, polyester sulfide, polyvinyl alcohol, polyvinylidene fluoride, polymer containing an ionically dissociatable group, or the like.

According to an embodiment of the present disclosure, the inorganic solid electrolyte may be an oxide- or sulfide-based solid electrolyte.

According to an embodiment of the present disclosure, the sulfide-based solid electrolyte may include Li, X and S, wherein X may include at least one selected from the group consisting of P, Ge, B, Si, Sn, As, Cl, F and I.

According to an embodiment of the present disclosure, the oxide-based solid electrolyte may include Li, A and O, wherein A may include at least one selected from the group consisting of La, Zr, Ti, Al, P and I.

According to an embodiment of the present disclosure, the positive electrode active material layer may further include a lithium salt.

According to an embodiment of the present disclosure, the lithium salt may include $Li^+$ as cation, and may include, as anion, at least one selected from the group consisting of $F^-$, $Cl^-$, $BR^-$, $I^-$, $NO_3^-$, $N(CN)_2^-$, $BF_4^-$, $ClO_4$, $AlO_4^-$, $AlCl_4^-$, $PF_6^-$, $SbF6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$.

According to an embodiment of the present disclosure, the negative electrode may include a current collector and a negative electrode active material layer formed on the surface of the current collector. The negative electrode active material layer may include a negative electrode active material, solid electrolyte, binder and a conductive material.

In general, the negative electrode current collector is formed to have a thickness of 3-500 μm. The negative electrode current collector is not particularly limited, as long as it has high conductivity while not causing any chemical change in the corresponding battery. The negative electrode current collector may be foil made of copper, gold, nickel, copper alloy, or a combination thereof.

The negative electrode active material is not particularly limited, as long as it is a negative electrode active material that may be used for a negative electrode. For example, the negative electrode active material may include a lithium-intercalatable material, such as carbon, petroleum coke, activated carbon, graphite, or other carbon materials.

Graphite may be natural graphite or artificial graphite.

The binder is an ingredient which assists binding between the electrode active material and the conductive material and binding to the current collector. In general, the binder is added in an amount of 0.1-50 wt % based on the total weight of the electrode mixture. High-molecular weight polyacrylonitrile-acrylic acid copolymers may be used as a binder, but the scope of the present disclosure is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. However, the binder is not limited thereto, and any binder ingredient used conventionally for an electrochemical device may be used with no particular limitation.

The conductive material may be any conductive material used conventionally for manufacturing an electrode. Non-limiting examples of the conductive material include any one selected from carbon nanotubes, acetylene black, carbon black, natural graphite, artificial graphite, Ketjen black, carbon fibers, and the like, or a combination of at least two of them. However, the conductive material is not limited thereto, and any conductive material ingredient used conventionally for an electrochemical device may be used with no particular limitation.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

First, a copper current collector having a thickness of 20 μm was prepared, and a mixture containing natural graphite, styrene butadiene rubber (SBR), carboxymethyl cellulose (CMC), a conductive material, polyethylene oxide (PEO) powder and lithium salt (bis-trifluoromethanesulfonimide, LiTFSI) powder at a weight ratio of 80:3:5:3:12.5 as negative electrode slurry was applied onto the copper current collector in an amount of 400 mg/25 $cm^2$. Then, the negative electrode slurry was vacuum dried at about 120° C. for 24 hours to obtain a negative electrode.

Then, 40 mg/$cm^2$ of solid-state ethylene carbonate (plasticizer) powder and 2.0 M of LITFSI powder (2 M based on 1 L of ethylene carbonate solution containing the lithium salt dissolved therein) were applied to the negative electrode surface to form a phase transformation layer.

After that, as a porous polymer sheet layer, a porous polyethylene substrate (SK Co.) having a thickness of 20 μm was stacked on the phase transformation layer.

Then, a solid polymer electrolyte layer having a thickness of 100 μm and including polyethylene oxide and a lithium salt at a weight ratio of 70:30 was prepared and stacked on the porous polyethylene substrate.

After that, the positive electrode obtained as described hereinafter was stacked on the solid polymer electrolyte layer to form an electrode assembly, followed by sealing, to obtain a coin cell. Then, aging was carried out at 60° C. for 1 hour. After manufacturing the coin cell, the plasticizer was present in a liquid state at room temperature.

The positive electrode was obtained as follows.

First, 80 parts by weight of NCM811 ($LiNi_{0.8}Co_{0.1}Mn_{0.1}O_2$) as a positive electrode active material, 11 parts by weight of polyethylene oxide (PEO) as a solid electrolyte, 3 parts by weight of LITFSI as an electrolyte salt, 3 parts by weight of a conductive material (vapor grown carbon fibers, VGCF) and 3 parts by weight of a binder polymer (polyvinyliene difluoride, PVDF) were mixed and acetonitrile (AN) as a solvent was further added considering viscosity to obtain positive electrode active material slurry.

The resultant positive electrode active material slurry was applied to an aluminum current collector having a thickness of 20 μm and vacuum dried at 120° C. for 24 hours to obtain a positive electrode.

EXAMPLE 2

A composite solid electrolyte membrane was obtained by the following method.

First, a solid polymer electrolyte layer including polyethylene oxide and a lithium salt mixed at a weight ratio of 70:30 and having a thickness of 100 μm was prepared.

Next, a porous polyethylene substrate (SK Co.) having a thickness of 20 μm was stacked on the solid polymer electrolyte layer.

Then, 40 mg/cm$^2$ of ethylene carbonate powder and 2.0 M of LITFSI powder (2 M based on 1 L of ethylene carbonate solution containing the lithium salt dissolved therein) were applied to the porous polyethylene substrate to form a phase transformation layer.

The composite solid electrolyte membrane obtained as described above was interposed between the negative electrode and positive electrode according to Example 1 to form an electrode assembly. The electrode assembly was introduced to a pouch, followed by sealing, to obtain a coin cell. Then, aging was carried out at 60° C. for 1 hour. After manufacturing the coin cell, the plasticizer was present in a liquid state at room temperature.

EXAMPLE 3

A coin cell was obtained in the same manner as Example 1, except that succinonitrile was used as a plasticizer instead of ethylene carbonate.

Comparative Example 1

A coin cell was obtained in the same manner as Example 1, except that the phase transformation layer and porous polyethylene substrate were not used.

Comparative Example 2

A coin cell was obtained in the same manner as Example 1, except that the porous polyethylene substrate was not used.

In the case of Comparative Example 2, only the phase transformation layer was present with no porous polymer sheet layer. In this case, the coin cell showed excellent initial life but the liquefied plasticizer was absorbed immediately to the solid polymer electrolyte layer. Thus, the interfacial resistance between the negative electrode and the composite solid electrolyte membrane was increased. Finally, Comparative Example 2 showed life characteristics which are not significantly different from those of Comparative Example 1.

Comparative Example 3

A coin cell was obtained in the same manner as Example 1, except that propylene carbonate, which is present in a liquid state at room temperature, was used as a plasticizer.

In the case of Comparative Example 3, the cell has excellent life characteristics, like a conventional lithium ion secondary battery. However, the cell shows poor safety.

Comparative Example 4

A coin cell was obtained in the same manner as Example 1, except that lithium salt powder was not used when forming a phase transformation layer.

In the case of Comparative Example 4, the plasticizer was present in a solid state at room temperature after manufacturing the coin cell, and the coin cell was not operated. Thus, it was not possible to determine the characteristics of the coin cell.

TEST EXAMPLES (1) Determination of Capacity Maintenance

Figure 3:
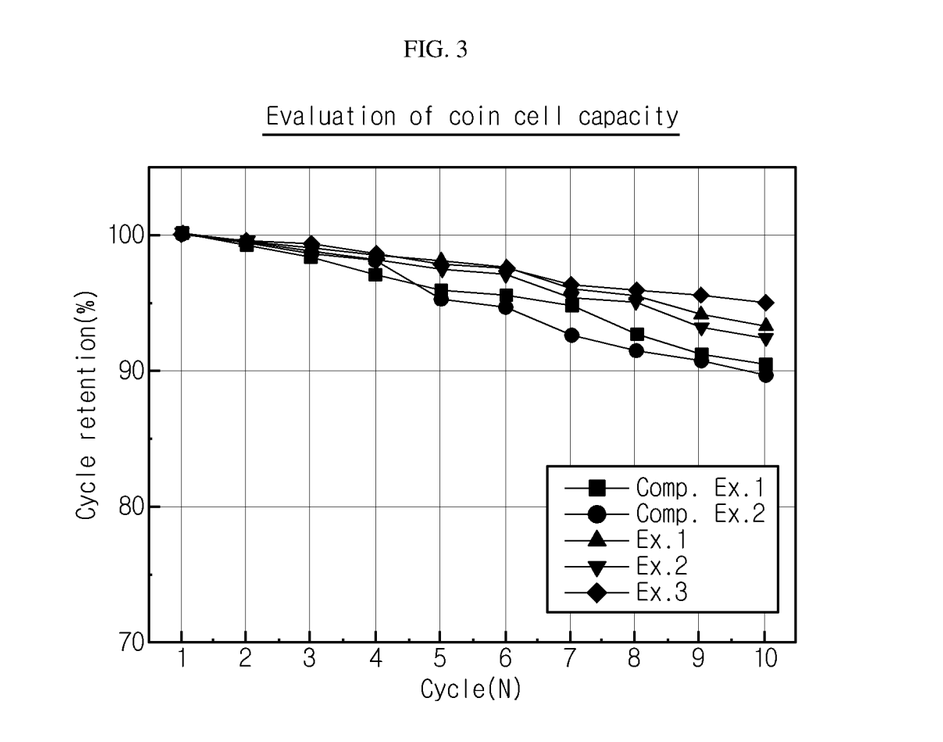
FIG. 3 is a graph illustrating the capacity maintenance of the batteries according to an embodiment of the present disclosure and Comparative Example.

Each of the batteries according to Examples and Comparative Examples was charged to 4.25V at 0.1 C in a constant current (CC)-constant voltage (CV) mode at room temperature, and discharged to 3V at 0.1 C in a constant current mode. This was repeated for 10 cycles to determine capacity maintenance. The results are shown in FIG. 3. As shown in FIG. 3, in the case of Comparative Example 1 having neither phase transformation layer nor porous polymer sheet layer, it can be seen that capacity maintenance is reduced rapidly. In addition, in the case of Comparative Example 2 having no porous polymer sheet layer, initial life is excellent but the liquefied plasticizer is absorbed immediately to the solid polymer electrolyte layer. Therefore, the interfacial resistance between the negative electrode and the composite solid electrolyte membrane is increased. Finally, the life characteristics are not significantly different from those of Comparative Example 1.

(2) Determination of Porosity

Porosity was determined by measuring the diameter of fine pores filled with mercury under a predetermined pressure according to the standard of ASTM D 4282-92. While applying a pressure of 0.5-60,000 psi continuously, the diameter of fine pores was measured at each predetermined pressure and the volume of mercury filled in a separator at that time is measured to determine porosity. Determination is carried out so that the measured and calculated values may be output automatically. The system used for determination is Autopore IV 9500 available from Micrometrics Co., and the range of pore sizes that can be determined in this manner is 0.003-360 μm.

(3) Determination of Pore Diameter

Mean flow pore size (MFPS) and maximum pore size were determined by using an automated capillary flow porometer [Porous Materials Inc. (PMI), Model CFP-1200AEL (CFP-34RTF8A-X-6-L4)]. The wetting fluid used for determination was galwick acid (surface tension: 15.9 dynes/cm)]. The adaptor plate had a diameter of 21 mm and the pore sizes were determined through a wet-dup/dry-up process.

DESCRIPTION OF DRAWING NUMERALS

100, 200: Electrode assembly
10: Negative electrode active material layer
20: Phase transformation layer
30: Porous polymer sheet layer
40: Solid polymer electrolyte layer
50: Softened solid polymer electrolyte layer
60: Positive electrode

What is claimed is:

1. A composite solid electrolyte membrane for an all-solid-state secondary battery, comprising:
    a phase transformation layer containing a plasticizer and a lithium salt;
    a porous polymer sheet layer; and
    a first solid polymer electrolyte layer,
    wherein the phase transformation layer, the porous polymer sheet layer and the first solid polymer electrolyte layer are stacked successively, and
    the phase transformation layer is liquefied at a temperature of 30° C. or higher so that it is incorporated into the porous polymer sheet layer.

2. The composite solid electrolyte membrane for an all-solid-state-secondary battery according to claim 1, wherein the plasticizer and lithium salt are in a solid state at 15-25° C.

3. The composite solid electrolyte membrane for an all-solid-state-secondary battery according to claim 1, wherein the plasticizer and lithium salt are liquefied at 30° C. or higher.

4. The composite solid electrolyte membrane for an all-solid-state-secondary battery according to claim 3, wherein when the plasticizer and lithium salt are liquefied the lithium salt is present at a concentration of 0.05-5.0 M based on the total mixture of the plasticizer and the lithium salt.

5. The composite solid electrolyte membrane for an all-solid-state-secondary battery according to claim 1, wherein the plasticizer has a melting point of 30-130° C.

6. The composite solid electrolyte membrane for an all-solid-state-secondary battery according to claim 1, wherein the plasticizer comprises any one selected from ethylene carbonate, polyethylene glycol having a weight average molecular weight of 1,000 or more, succinonitrile, cyclic phosphate, or a mixture thereof.

7. The composite solid electrolyte membrane for an all-solid-state-secondary battery according to claim 1, wherein the lithium salt comprises $Li^+$ as cation, and comprises, as anion, $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, $(CF_3CF_2SO_2)_2N^-$, or a mixture thereof.

8. The composite solid electrolyte membrane for an all-solid-state-secondary battery according to claim 1, wherein the plasticizer and the lithium salt are used at a weight ratio of 99:1-40:60.

9. The composite solid electrolyte membrane for an all-solid-state-secondary battery according to claim 1, wherein the porous polymer sheet layer has a thickness of 5-50 μm and a porosity of 40-60%.

10. The composite solid electrolyte membrane for an all-solid-state-secondary battery according to claim 1, wherein the first solid polymer electrolyte layer comprises a solid polymer electrolyte.

11. The composite solid electrolyte membrane for an all-solid-state-secondary battery according to claim 1, wherein the first solid polymer electrolyte layer has a thickness of 5-300 μm and a porosity of 0-30%.

12. The composite solid electrolyte membrane for an all-solid-state-secondary battery according to claim 1, wherein the porous polymer sheet layer comprises any one selected from polyethylene; polypropylene; polybutylene; polypentene; polyhexene; polyoctene; a copolymer of at least two of ethylene, propylene, butane, pentene, 4-methylpentene, hexene, octene; or a mixture thereof.

13. An all-solid-state secondary battery, comprising: a positive electrode; a negative electrode; and the composite solid electrolyte membrane of claim 1, wherein the phase transformation layer in the composite solid electrolyte membrane is disposed in such a manner that it faces the negative electrode, the negative electrode comprises a graphite-based material, and the plasticizer and lithium salt are in a solid state at 15-25° C.

14. The all-solid-state secondary battery according to claim 13, wherein the graphite-based material comprises natural graphite, artificial graphite, mesocarbon microbeads (MCMB), carbon fibers, carbon black, soft carbon, hard carbon, or a mixture thereof.

15. The all-solid-state secondary battery according to claim 13, wherein the plasticizer has a melting point of 30-130° C., and the all-solid-state secondary battery is activated at a temperature ranging from the melting point of the plasticizer to 130° C.

16. The all-solid-state secondary battery according to claim 13, which comprises a second solid polymer electrolyte layer between the first solid polymer electrolyte layer and the porous polymer sheet layer, and the second solid polymer electrolyte layer has a decreased viscosity than the first solid polymer electrolyte layer.

17. The composite solid electrolyte membrane for an all-solid-state-secondary battery according to claim 1, wherein the phase transformation layer has a layered structure.

18. The composite solid electrolyte membrane for an all-solid-state-secondary battery according to claim 1, wherein the phase transformation layer includes a first phase transformation layer including the plasticizer and a second phase transformation layer including the lithium salt.

* * * * *